(12) United States Patent
Stephan (10) Patent No.: US 12,180,674 B2
(45) Date of Patent: Dec. 31, 2024

(54) LAND PLANE ATTACHMENT WITH MECHANICAL RIPPER

(71) Applicant: Michael F. Stephan, Osceola, WI (US)

(72) Inventor: Michael F. Stephan, Osceola, WI (US)

( * ) Notice: Subject to any disclaimer, the term of this patent is extended or adjusted under 35 U.S.C. 154(b) by 752 days.

(21) Appl. No.: 17/375,056

(22) Filed: Jul. 14, 2021

(65) Prior Publication Data

US 2022/0018091 A1    Jan. 20, 2022

Related U.S. Application Data

(60) Provisional application No. 63/053,257, filed on Jul. 17, 2020.

(51) Int. Cl.
*E02F 3/80* (2006.01)
*E02F 3/815* (2006.01)

(52) U.S. Cl.
CPC .................. *E02F 3/8155* (2013.01)

(58) Field of Classification Search
CPC ......... A01B 31/00; A01B 49/02; A01B 63/24; A01B 61/044; E02F 3/7622; E02F 3/7604; E02F 3/815
See application file for complete search history.

(56) References Cited

U.S. PATENT DOCUMENTS

| | | | | |
|---|---|---|---|---|
| 3,058,243 A * | 10/1962 | McGee | ................. | E02F 3/8155 172/197 |
| 3,470,964 A * | 10/1969 | Collins | ................. | A01B 31/00 172/197 |
| 3,891,045 A * | 6/1975 | Pancella | ................. | B60K 17/10 180/6.3 |
| 6,283,225 B1 * | 9/2001 | Hermonson | .......... | E02F 3/3414 172/830 |
| 6,546,650 B1 * | 4/2003 | Meurer | ................... | E02F 3/401 37/405 |
| 8,083,005 B1 * | 12/2011 | Nicolai | .................. | A01B 31/00 172/779 |
| 10,704,224 B1 * | 7/2020 | Hauer | ................... | E02F 9/2271 |
| 2004/0244233 A1 * | 12/2004 | Johnson | ................. | E02F 3/815 37/381 |
| 2008/0187426 A1 * | 8/2008 | Page | ........................ | E02F 9/02 414/686 |

* cited by examiner

*Primary Examiner* — Adam J Behrens
*Assistant Examiner* — Ashley A Kaercher
(74) *Attorney, Agent, or Firm* — DeWitt LLP (57) ABSTRACT

A land plane with a ripper, including a plane portion including at least two cutter bars and a ripper mechanism having a ripper bar assembly having ripper teeth that are shiftable between a downwardly extended orientation in which the ripper teeth are biased to extend downwardly beyond the at least two cutter bars thereby facilitating ground engaging contact of the ripper teeth and a retracted orientation in which the ripper teeth are above the at least two cutter bars. The ripper mechanism further includes a latching mechanism and a reset bar extending outwardly away from the plane portion and coupled to the latching mechanism. The reset bar is shiftable between a first position wherein the ripper teeth are secured in the retracted orientation by the latching mechanism and a second position wherein the ripper teeth are biased toward the extended position by the latching mechanism.

20 Claims, 7 Drawing Sheets

LAND PLANE ATTACHMENT WITH MECHANICAL RIPPER

CROSS-REFERENCE TO RELATED APPLICATIONS

This application claims the benefit of U.S. Provisional Patent Application No. 63/053,257, filed Jul. 17, 2020, entitled "Land Plane Attachment With Mechanical Ripper," which is hereby fully incorporated herein by reference

TECHNICAL FIELD

The invention relates generally to attachments for skid steer loaders. More particularly, the invention relates to attachments for land planning, soil ripping and general grading activities.

BACKGROUND

Skid steer loaders and other implement carriers such as tractors are commonly used to move and shape the earth, for example, to accommodate drainage, water shedding, leveling areas to accommodate sports activities, smoothing driveways, and carving out aesthetic landscape features.

Some common attachments or implements used in these applications include buckets, rakes, box graders, soil conditioners, and land planes.

Buckets may be the most versatile and commonly used implements because they can be used to scrape, dig, and relocate soil. Typically, skid steer loaders are equipped with a bucket for these applications.

Rakes are usually utilized if the basic grade and contours of the soil are already established, and an operator is simply roughing up the soil surface, or simply collecting and removing debris. Debris may include rocks, excavated roots and branches for example.

Box graders are implements that are typically attached to the rear of tractors, and are effective when utilized to accomplish dragging, filling holes, and loosening hard or compacted soil.

Another implement often used is a soil conditioner. A soil conditioner includes a hydraulically driven rotating drum with staggered teeth or nubs protruding from the drum that grind and churn the soil as the drum is spun and the rotating drum or drums are placed in contact with the soil surface. Soil conditioners can be operated to accomplish some soil shaping, however they are more commonly used to loosen the surface of the soil in preparation for seeding such as seeding lawns. Soil conditioners are operated to rake stones and debris to either side or straight ahead for later pickup. A rotary drum with aggressive teeth can be used to pulverize the soil and to separate rocks, tear up sod, and to reduce dirt clods.

Land planes are commonly attached to the front of skid steer loaders (implement carriers), and are effectively operated for scraping, carving, and dragging dirt to fill low areas. An example of a land plane is disclosed in U.S. Pat. No. 8,083,005B1.

Some land planes feature ripper teeth that can be used in difficult soil conditions. When the ground is very compacted or rocks are embedded in the soil, making a change in grade may be difficult. The availability of ripper teeth can allow an operator to loosen the soil without changing to a different implement thereby making the soil looser and more easily manipulated to the shape that the operator wants to achieve. Typically, ripper teeth are an option available for land planes, buckets, and box graders. Ripper teeth are usually movable to be retractable and extendable so that they are extended to be engaged with the soil only during times that the operator wants to loosen the soil and retracted when the operator wants to shape and grade the soil.

Ripper teeth are usually moved manually by the operator or by a hydraulic actuator controlled by the operator. An example of a grading attachment including mechanically operated ripper teeth is disclosed in U.S. Pat. Nos. 2,865,117A, 2,839,851A and published application US20060249293A1. Hydraulically operated ripper teeth are common, for example such a device and method are disclosed in U.S. Pat. No. 4,320,988A.

Whether ripper teeth are mechanically manipulated, which require the operator to leave the operator's position, or hydraulically actuated which requires an auxiliary hydraulic connection to the skid steer loader, the need to manipulate ripper teeth creates an inconvenience for the operator. This inconvenience can result in waste of time and money. The need to leave the operator's position in the cab of the prime mover also can create an unsafe condition where the operator is outside of the operator station in the cab and potentially exposed to unsafe and busy worksite conditions.

Accordingly, there is still room for improvement in the context of land planes that include extendable and retractable ripper teeth.

SUMMARY

Example embodiments of the invention solve many of the above problems by making available a land plane attachment with ripper teeth that are deployable and retractable without the use of auxiliary hydraulics from the machine, and do not require the operator to leave the cab of the machine in order to deploy or retract the ripper teeth.

The new invention also provides a mechanical set, reset system that holds the teeth in the retracted position, and, once reset, allows the teeth to rotate to the engaged position. The engaged position is also movably engaged, so that the ripper teeth are only digging during forward travel. When the operator travels in reverse, the ripper teeth are allowed to rotate upward slightly so as to not interfere with the leveling function of the land plane. Thus, the operator is able to have the teeth in the engaged position and move forward in a loosening and ripping function, and immediately switch back to reverse and into a leveling function. The ability to rip going forward and level going backwards without having to adjust the ripper teeth makes the operator extremely efficient and fast. Furthermore, if the ripper teeth are not required at all, the operator can lift the attachment using the loaders arms of the skid steer, tilt the new invention down, and push the reset lever against the ground to fully retract the teeth, and lock them into the retracted position until they are desired again. In order to engage the teeth once again, the operator simply lifts, tilts, and pushes the reset bar of the new invention against the ground once again, and the teeth will rotate to their engaged position.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Referring to FIGS. 1-7, land plane 10 according to an example embodiment of the invention, generally includes attachment plate 12, plane portion 14, vertical ribs 16 and ripper mechanism 18.

Attachment plate 12, in an example embodiment, is a generally conventional attachment plate adapted to couple with a standardized skid steer loader adapter. The structure and dimensions of attachment plate 12 is known to those of skill in the art and need not be further described here.

Plane portion 14 generally includes base assembly 20, including cutter bars 22 and side connectors 24.

Cutter bars 22 are typically formed of angles 26 joined to base plates 28. Base plates 28 may include front and rear beveled edges 30 as depicted, for example, in FIG. 3. Angles 26 may be joined to base plates 28, for example, by welding. Cutter bars 22 are further joined to side connectors 24. Typically, cutter bars 22 are oriented generally parallel to one another and are coupled to side connectors 24, also typically by welding. Base assembly 20 is typically formed of steel but may be formed of other rigid materials of sufficient strength. In the depicted embodiment, side connectors 24 are constructed of steel angle.

Vertical ribs 16 couple attachment plate 12 to plane portion 14 and generally are formed from, for example, steel plate by cutting. In the depicted embodiment vertical ribs 16 are each a unitary structure including attachment plate portion 32 and several cutter bar portions 34. In the depicted example embodiment three cutter bar portions 34 extend downwardly and are coupled to angles 26 of cutter bars 22. Cutter bar portions 34 include front cutter bar portion 36, middle cutter bar portion 38 and rear cutter bar portion 40. Cutter bar portions 34 may be joined to angles 26 of cutter bars 22 for example by welding. Vertical ribs 16 may further present hook portion 42 extending upwardly and rearwardly as well as cam arm pin 43.

Side connectors 24 further include reset bar supports 44 and ripper bar blocks 45.

Ripper mechanism 18 generally includes ripper bar assembly 46, reset lever assembly 48, spring assembly 50 and latching mechanism 52.

Ripper bar assembly 46 generally includes ripper axle 54, ripper square bar 56, ripper teeth 58, reset crank 60, spring crank 62, and latch crank 64. Ripper square bar 56 spans approximately the width of plane portion 14. Ripper axle 54 extends through and beyond the ends of ripper square bar 56. Ripper square bar 56 supports ripper teeth 58 extending outwardly therefrom generally perpendicular to ripper square bar 56. Reset crank 60 and spring crank 62 extend outwardly away from ripper square bar 56 at approximately a right angle to ripper teeth 58. In the depicted embodiment, reset crank 60 and spring crank 62 are separated from one another by approximately one third of the length of ripper square bar 56. Ripper axle 54 is sized and shaped to be received by ripper bar blocks 45. Reset cranks 60 are located at opposing ends of ripper axle 54. Ripper square bar 56 may be formed as a solid structure or as a square tube into which ripper axle 54 is received.

Reset lever assembly 48 generally includes reset bar 68, reset levers 70 and connecting rods 72. In the depicted embodiment reset bar 68 is fabricated from reset angle 74 and reset tube 76. Reset bar 68 spans approximately the width of plane portion 14. Reset bar 68 is coupled to reset levers 70 at a front end thereof typically by welding. Reset levers 70 are rotatably coupled to connecting rods 72 proximate an opposing end from reset bar 68. Reset lever 70 further include downward extending portion 78 and forward extending portion 80. Reset lever 70 may be pierced by several adjustment apertures 82 where it is rotatably coupled to connecting rod 72.

Downward extending portion 78 presents coupling hole 84 through which a fastener may be inserted to rotatably couple reset lever 70 to reset bar supports 44. Connecting rod 72 is rotatably coupled at first end 86 to reset lever 70 and at a second end 88 to reset crank 60.

Spring assembly 50 generally includes spring 90, spring mounting 92, spring shaft 94 and adjusting nut 96. Spring mounting 92 couples spring 90 to at least one of vertical ribs 16. Spring shaft 94 is structured to be rotatably coupleable to spring crank 62.

Latching mechanism 52 generally includes control arm 98, cam arm 100 and cam 102.

Control arm 98 is a generally flat structure presenting an elongate rectangular shape defining first longitudinal slot 104, second longitudinal slot 106 and cam shaft 108 located between first longitudinal slot 104 and second longitudinal slot 106. Cam arm 100 also defines distal ripper bar aperture 110.

Cam arm 100 is a generally flat structure presenting an elongate shape defining distal aperture 112, proximal aperture 114 and cam receiving cutout 116. Cam receiving cutout 116 is surrounded by distal plateau 118, vertical wall 120, horizontal floor 122, proximal slope 124, proximal wall 126, angled overhang 128 and proximal ridge 130. Cam arm 100 further includes proximal slot pin 132 and distal slot pin 134 sized and shaped to be slidably receivable within first longitudinal slot 104 and second longitudinal slot 106.

Cam 102 is generally rectangular in shape and presents four lobes 136 and four indentations 138 and is rotatably supported on cam shaft 108. Indentations 138 include long indentations 140 and short indentations 142. Lobes 136 are located substantially at corners of a rectangle and present an acute angled shape.

Figure 1:
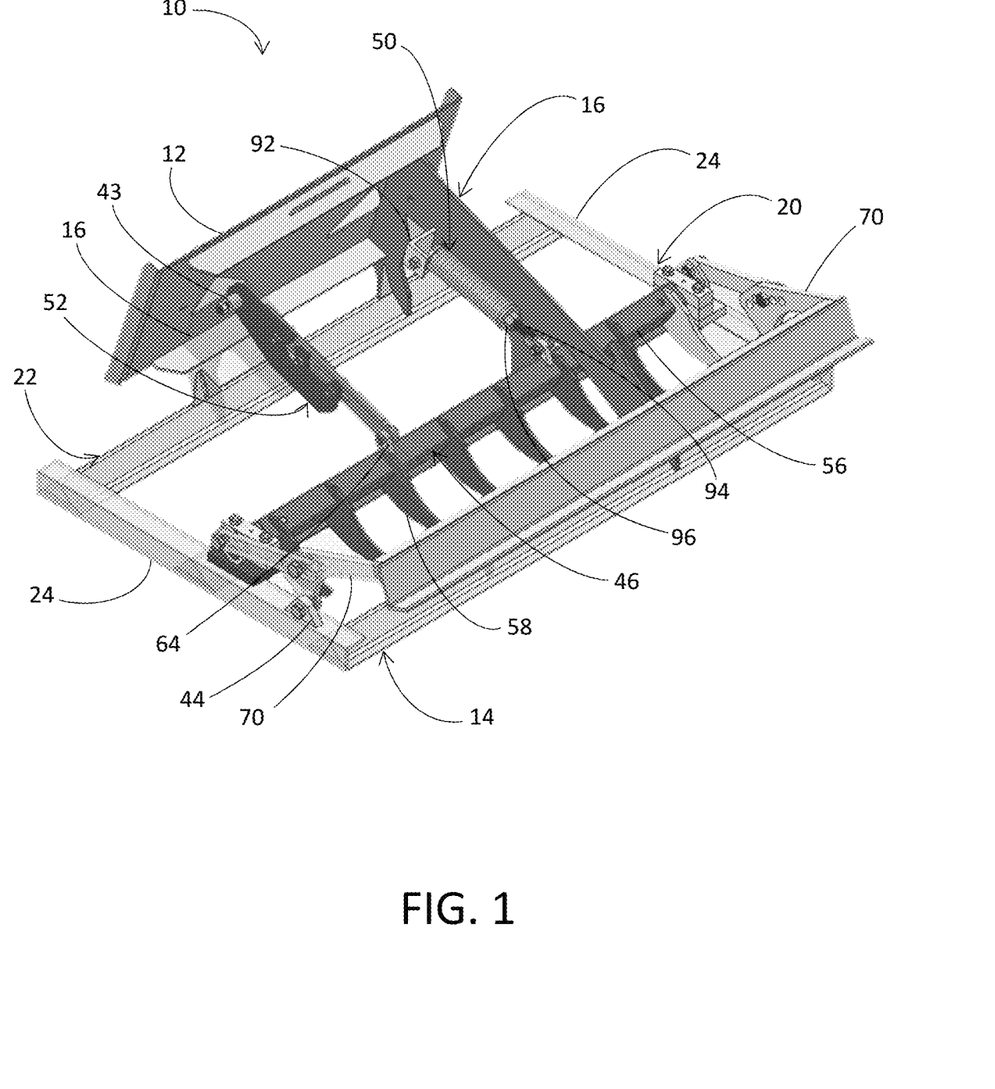
FIG. 1 is a perspective view of a land plane with ripper according to an example embodiment of the invention with ripper teeth in a retracted orientation.

In operation referring to FIG. 1, land plane 10 is depicted with ripper teeth 58 in a retracted position. Ripper teeth 58 are held in the retracted position by the latching mechanism 52. Latching mechanism 52 is coupled by cam arm pin 43 to vertical ribs 16. Vertical ribs 16 are fixedly mounted to attachment plate 12, and multiple cutter bars 22. Base assembly 20 includes multiple cutter bars 22 and side connectors 24. Attachment plate 12 is used to attach land plane 10 to various implement carriers, such as skid steer loaders. Cutter bars 22 are used to cut, carve, and smooth the dirt as the operator manipulates the tilt and height of land plane 10 while it is attached to the carrier. Such implement carriers, method of attachment, tilt and height manipulation is common to the industry and known to those that use skid steer attachments. FIG. 1 depicts ripper teeth 58 in a retracted position. Multiple ripper teeth 58 are fixedly mounted to ripper square bar 56. Ripper square bar 56 of ripper bar assembly 46 is rotatably mounted to the base assembly 20, and the rotation of ripper square bar 56 is controlled by spring assembly 50, latching mechanism 52, and reset lever 70.

Figure 3:
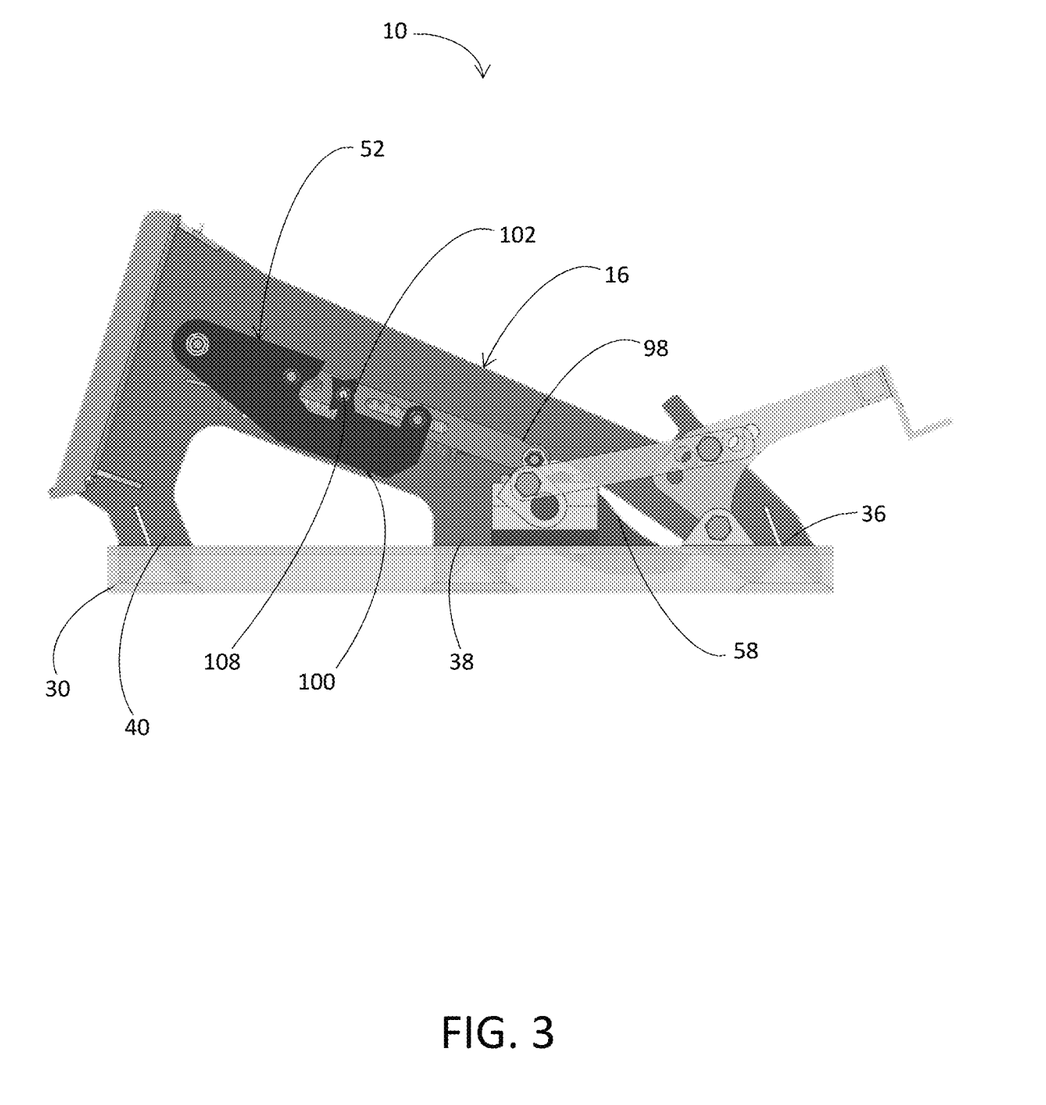
FIG. 3 is a side view of the land plane with certain structures depicted in phantom with the ripper teeth in the retracted orientation.
Figure 4:
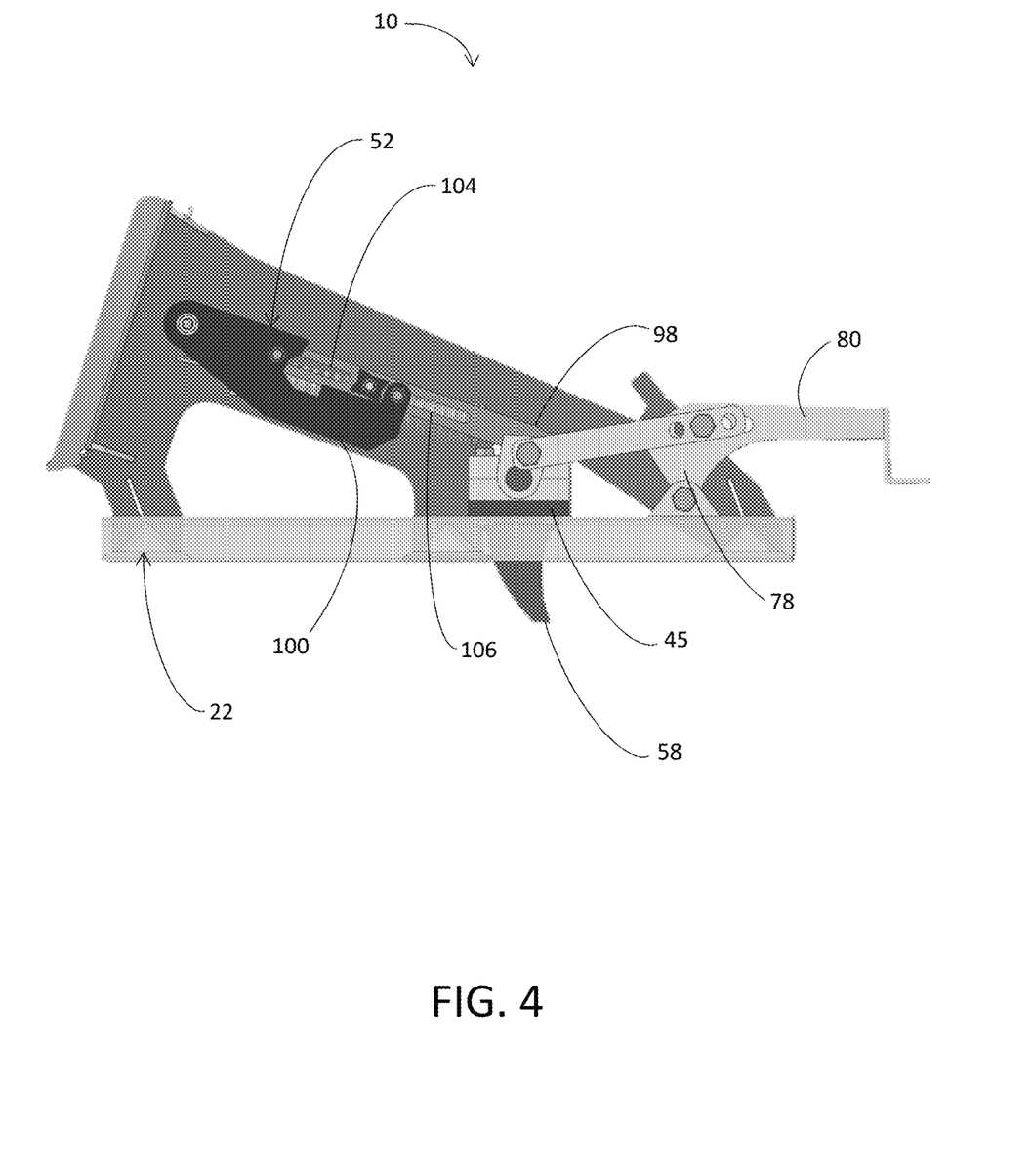
FIG. 4 is a side view of the land plane with certain structures depicted in phantom with the ripper teeth in the extended orientation.

FIG. 3 depicts latching mechanism 52 including cam arm 100, cam 102 and control arm 98 with ripper teeth 58 in a retracted orientation. Latching mechanism 52 is attached to one of the vertical ribs 16, and pivotally attached to the ripper square bar 56 in such a manner as to control the rotation movement of the ripper square bar 56. As ripper square bar 56 rotates, control arm 98 is drawn longitudinally to the extent of the length of first longitudinal slot 104 and second longitudinal slot 106 in control arm 98. Therefore, the rotational movement of ripper square bar 56 and the longitudinal movement of control arm 98 are associated. FIG. 4 depicts ripper square bar 56 rotated clockwise to the full extent of first longitudinal slot 104 and second longitudinal slot 106.

Figure 5:
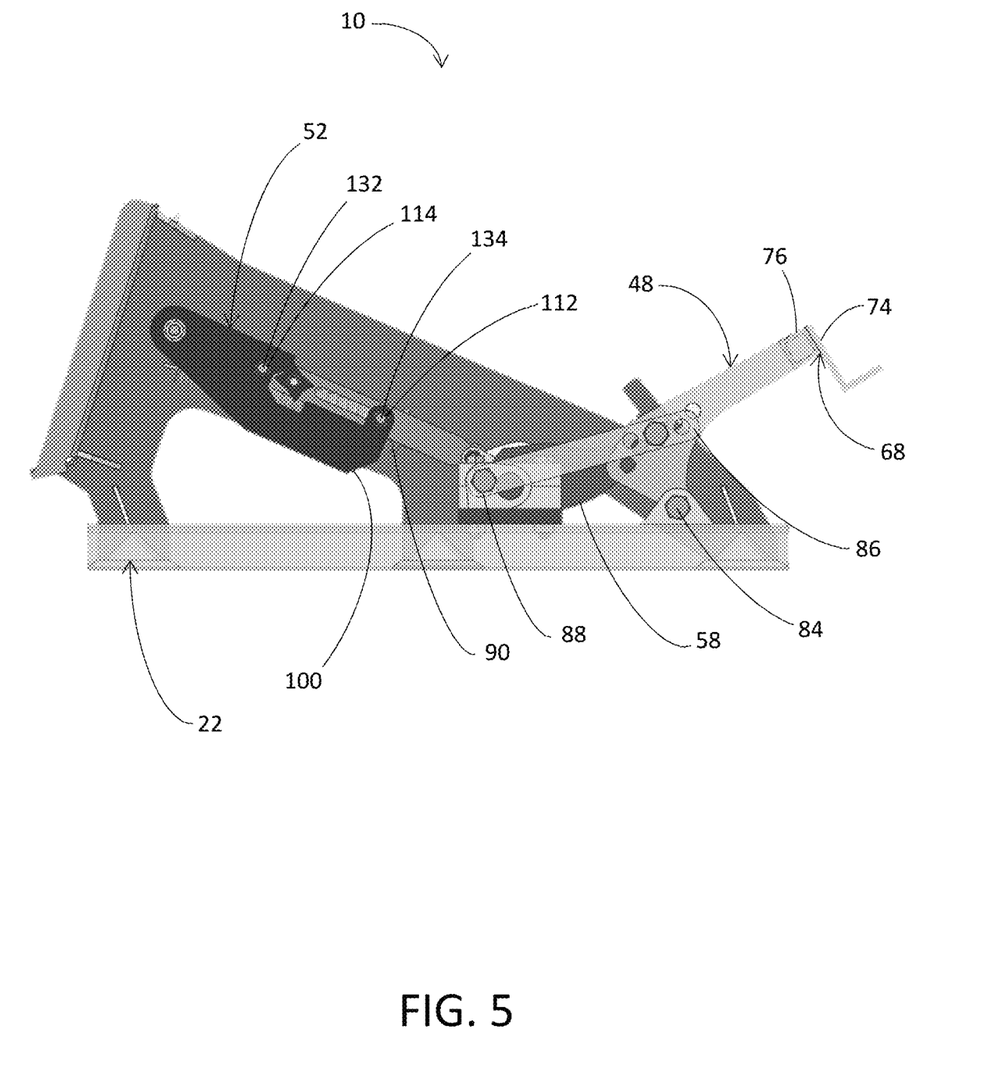
FIG. 5 is a side view of the land plane with a reset bar in an orientation in which a latching mechanism is in a retracted position.

FIG. 5 depicts ripper square bar 56 rotated counter-clockwise to the full extent of first longitudinal slot 104 and second longitudinal slot 106.

Figure 2:
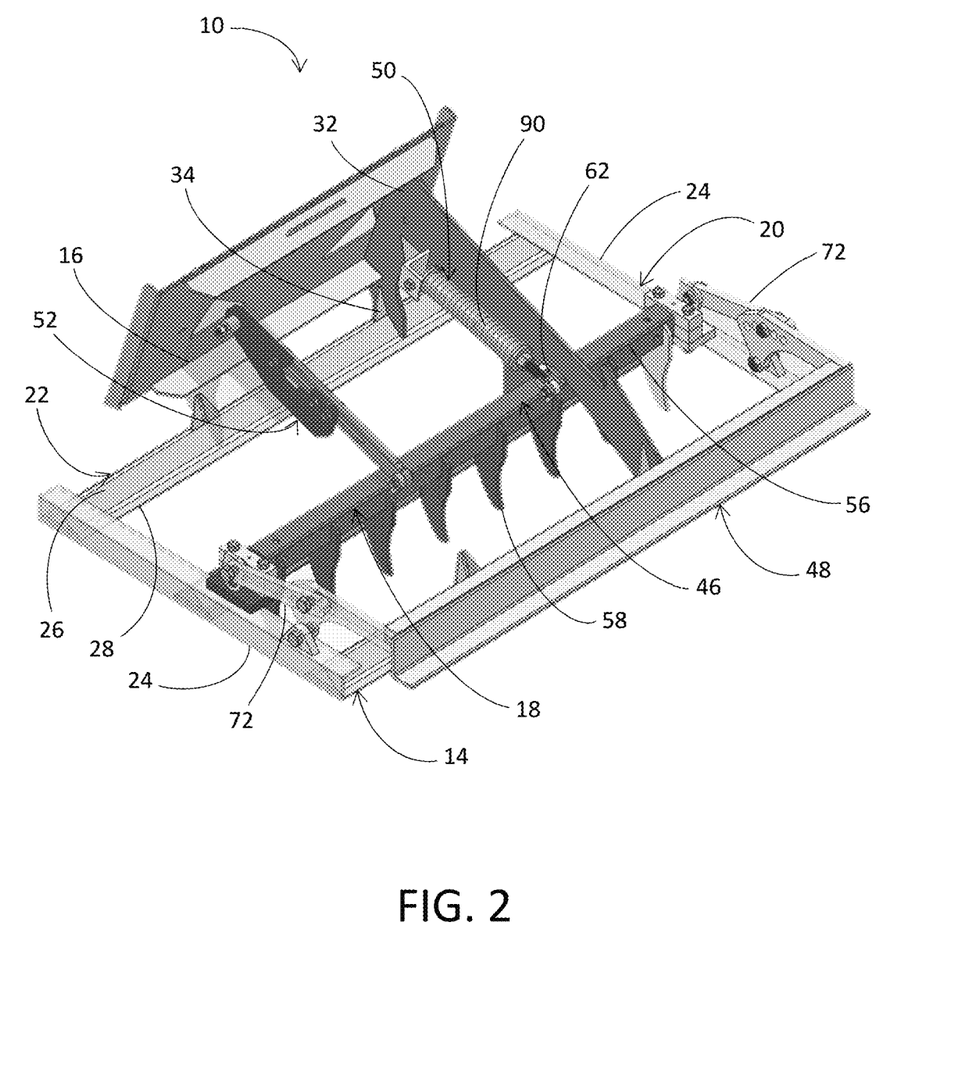
FIG. 2 is a perspective view of the land plane of FIG. 1 with the ripper teeth in an extended position orientation.
Figure 7:
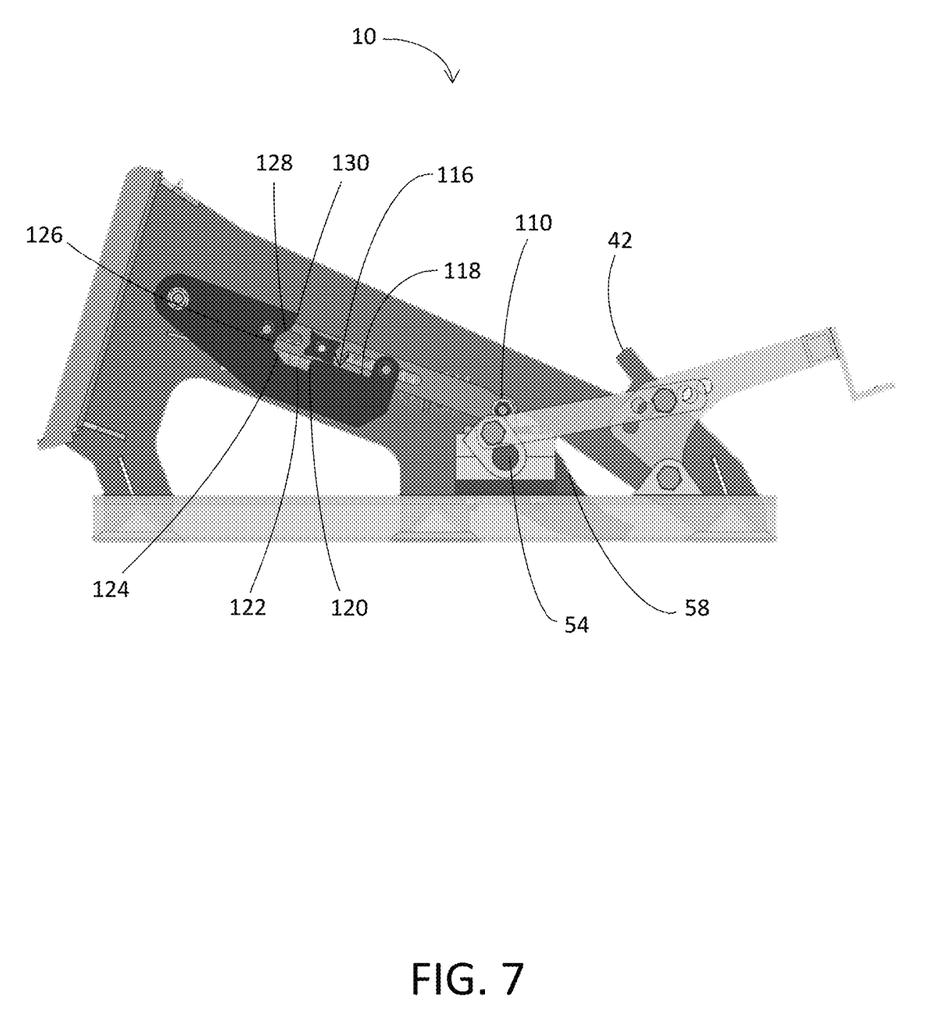
FIG. 7 is a side view of the land plane depicting the ripper teeth partially retracted as when the prime mover is moving in a rearward direction.

FIG. 4 depicts a side view of land plane 10 with ripper square bar 56 rotated fully into an engaged position so that ripper teeth 58 positioned for engaging the ground as an operator moves the carrier and land plane 10 forward along the ground. Cutter bars 22 are pushed along parallel to the ground surface, or the grade that is desired to be achieved. Ripper teeth 58 engage the ground, and are forced several inches into the ground, loosening and turning the soil to enable cutting bars 22 to more easily break the ground plane. Moving forward land plane 10 cuts and rips the ground. Moving backward, the operator can leave land plane 10 in a position that is parallel to the ground, and drag land plane 10 backwards. The back side of ripper teeth 58 encounter the ground plane, and thus force ripper square bar 56 to rotate counter-clockwise as depicted in FIG. 7. During counter-clockwise rotation of ripper square bar 56, spring 90 depicted in FIGS. 1 and 2 is compressed, and causes some resistance so that ripper square bar 56 and ripper teeth 58 are biased toward a full engaged position as soon as the operator starts moving the carrier in a forward direction again. This spring loaded rotation of ripper square bar 56 and ripper teeth 58 enables automatic engagement and retraction of ripper teeth 58 and greatly improves the operator efficiency.

FIG. 4 also depicts cam 102 in an engaged position proximate distal end of cam arm 100. Cam 102 is rotatably mounted to control arm 98, and control arm 98 is connected to cam arm 100 so as to allow control arm 98 and cam arm 100 to slide relative to each other in opposing directions, limited by first longitudinal slot 104 and second longitudinal slot 106 and connecting rod 72. As the ripper square bar 56 rotates, control arm 98 slides against cam arm 100, and is controlled by first longitudinal slot 104 and second longitudinal slot 106 and connecting rod 72. Cam 102 also travels to a new relative position within the confines of the cam arm 100. An example of this relationship can be seen in FIG. 4 and FIG. 7.

FIG. 5 depicts a side view of land plane 10 with reset lever in a raised orientation, and latching mechanism 52 being reset into a retracted position. By lift and tilt manipulation of the carrier boom the operator lifts land plane 10 off the ground and tips the front down towards the ground to rotate reset lever assembly 48 upward. Reset lever assembly 48 moves connecting rod 72 thus forcing ripper square bar 56 and ripper teeth 58 to rotate counter-clockwise, and in turn pushes control arm 98 and cam 102 along first longitudinal slot 104 and second longitudinal slot 106. Cam 102 encounters proximal wall 126 and proximal slope 124 of the back internal profile of cam arm 100. This contact slightly rotates cam 102 in preparation to lock latching mechanism 52 into a ripper teeth 58 retracted position.

The operator lifts land plane 10 off the ground with the carrier boom, and spring 90 biases ripper square bar 56 and ripper teeth 58 clockwise until cam 102 encounters lip profile of cam arm 100. Since cam 102 is pivotally mounted to control arm 98, and the sliding motion of control arm 98 is limited by first longitudinal slot 104 and second longitudinal slot 106, the shape and rotation of cam 102 blocks control arm 98 from continuing sliding along first longitudinal slot 104 and second longitudinal slot 106 and thus prevents ripper square bar 56 and ripper teeth 58 from continuing clockwise rotation. Ripper teeth 58 are now suspended in the retracted position until the operator completes the lift, tilt, and raising of reset lever assembly 48. This position is used primarily when the ground is loose enough to allow cutter bars 22 to cut and dig sufficiently.

Figure 6:
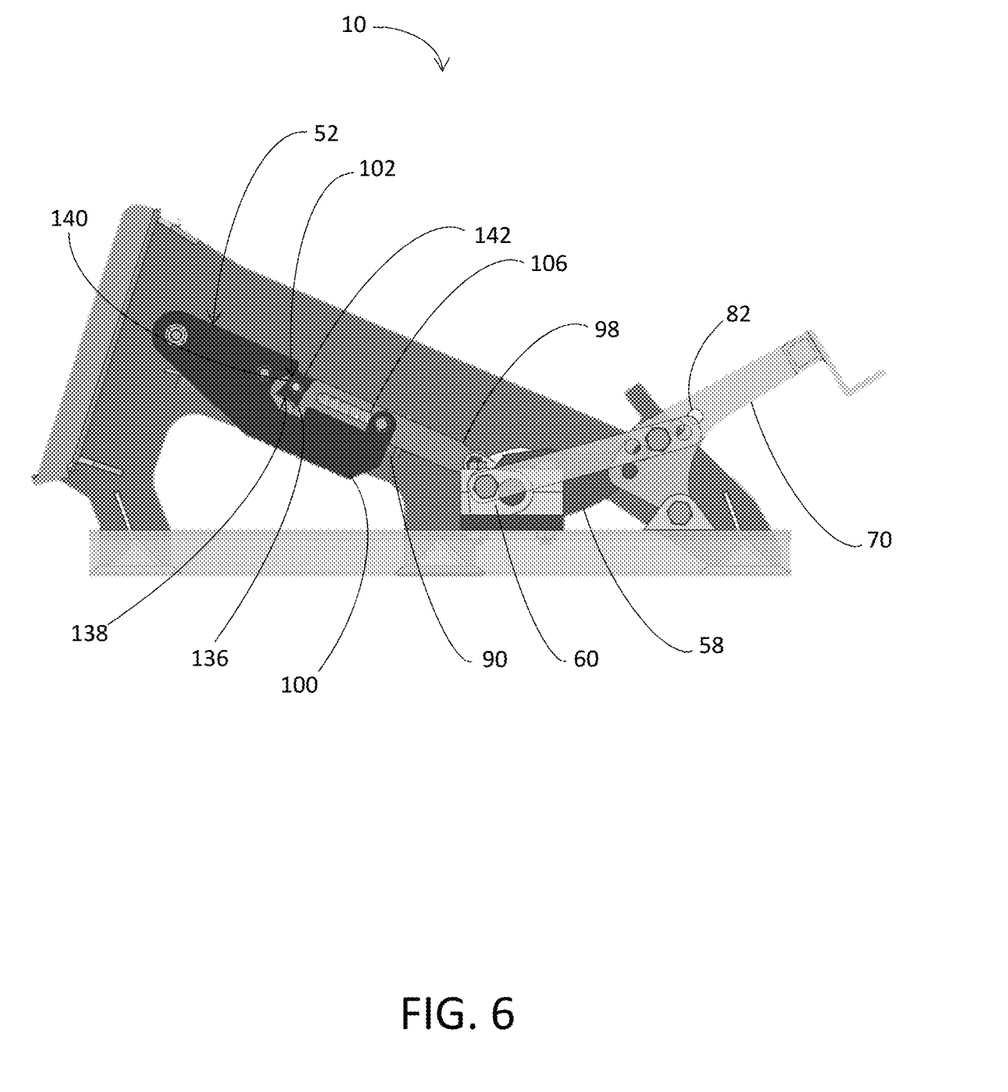
FIG. 6 is a side view of the land plane with the reset bar in an orientation in which the latching mechanism is in an engaged position.

FIG. 6 depicts a side view of land plane 10 with reset lever assembly 48 raised, and control arm 98 and cam 102 slid along first longitudinal slot 104 and second longitudinal slot 106 until cam 102 encounters proximal slope 124 and proximal wall 126 of rear profile of cam arm 100. Cam 102 is rotated slightly to align with proximal slope 124 and proximal wall 126 cam arm 100, and prepare latching mechanism 52 depicted in FIG. 1 to reset into the engaged position. The operator lifts land plane 10, enabling reset lever 70 to rotate down assisted by the spring tension of spring 90. As reset lever 70 rotates, ripper square bar 56 and ripper teeth 58 rotate clockwise, and control arm 98 travels along first longitudinal slot 104 and second longitudinal slot 106. Cam 102 moves along with control arm 98, and eventually encounters vertical wall 120 and distal plateau 118 of cam arm 100. Cam 102 is rotated slightly as it passes vertical wall 120 and distal plateau 118 of cam arm 100, and is allowed to pass fully into the engaged range of latching mechanism 52 represented in FIGS. 4 and 7.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A land plane with a ripper, comprising:
a plane portion including at least two cutter bars;
a ripper mechanism comprising a ripper bar assembly having ripper teeth that are shiftable between a downwardly extended orientation in which the ripper teeth extend downwardly beyond the at least two cutter bars thereby facilitating ground engaging contact of the ripper teeth and a retracted orientation in which the ripper teeth are above the at least two cutter bars;
the ripper mechanism further comprising a latching mechanism configured to extend the ripper teeth in the downwardly extended orientation wherein the ripper teeth are in the extended orientation; and
a reset bar extending outwardly away from the plane portion and operably coupled to the latching mechanism, the reset bar being shiftable between a first position wherein the ripper teeth are secured in the retracted orientation by the latching mechanism and a second position wherein the ripper teeth are in the extended position by the latching mechanism, the reset bar being positioned and configured so that the reset bar is manipulable between the first position and the second position by being selectively brought into contact with the ground by manipulation of the land plane when the land plane is operably coupled to lift arms of an implement carrier.

2. The land plane as claimed in claim 1, wherein the latching mechanism further comprises a cam arm and a control arm, the control arm being operably coupled to the ripper bar assembly and the control arm being longitudinally slidably coupled to the cam arm.

3. The land plane as claimed in claim 2, wherein the control arm further defines two collinear longitudinal slots therein and further comprises a cam rotatable on a shaft located between the two slots.

4. The land plane as claimed in claim 3, wherein the cam further comprises four lobes located at four corners thereof.

5. The land plane as claimed in claim 2, wherein the cam arm further defines a cam receiving cutout bounded by a distal plateau, a vertical wall, a horizontal floor, a proximal slope, a proximal wall, an angled overhang, and a proximal ridge.

6. The land plane as claimed in claim 2, wherein the reset bar is coupled to a reset lever which is coupled by a connecting rod to the ripper which is also coupled to the latching mechanism.

7. The land plane as claimed in claim 1, wherein the ripper mechanism further comprises an elongate structural member to which the ripper teeth are fixedly coupled, the elongate structural member being rotatably supported by the plane portion.

8. The land plane as claimed in claim 1, further comprising a standard adapter plate to couple to a skid steer loader.

9. The land plane as claimed in claim 1, wherein the latching mechanism that is configured to extend the ripper teeth in the downwardly extended orientation further comprises a biasing member that biases the ripper teeth toward the extended orientation such that the ripper teeth are least partially retractable upon motion in a first direction of the land plane, the first direction being opposed to a second direction in which the ripper teeth engage and rip soil.

10. The land plane as claimed in claim 1, wherein the ripper teeth are rotatably coupled to the plane portion.

11. A method of shifting ripper teeth of a land plane, the method comprising:
manipulating the land plane by operation of lift arms of a prime mover to contact a ground surface with a reset bar operably coupled to a latching mechanism thereby manipulating the latching mechanism to extend the ripper teeth in a downwardly extended orientation; and
manipulating the land plane by operation of the lift arms of the prime mover to contact the ground surface with the reset bar to secure the ripper teeth in a retracted orientation.

12. The method as claimed in claim 11, further comprising engaging and disengaging a latching mechanism while shifting the ripper teeth of the land plane between the extended orientation and the retracted orientation.

13. The method as claimed in claim 11, further comprising engaging and disengaging a cam rotatably coupled to a control arm with a cam arm while shifting the ripper teeth of the land plane between the extended orientation and the retracted orientation and engaging and disengaging the cam with portions of a perimeter of a cam receiving cutout of the cam arm.

14. The method as claimed in claim 13, further comprising biasing the ripper teeth toward the extended orientation to be at least partially retractable upon motion in a first direction of the land plane, the first direction being opposed to a second direction in which the ripper teeth engage and rip soil; and
retracting the ripper partially against a biasing force by moving the land plane in the second direction.

15. A method of shifting ripper teeth of a land plane, the method comprising:
shifting a ripper mechanism comprising the ripper teeth between a downwardly extended orientation in which the ripper teeth are extend downwardly beyond at least two cutter bars thereby facilitating ground engaging contact of the ripper teeth and a retracted orientation in which the ripper teeth are above the at least two cutter bars by engaging a reset bar with a ground surface by manipulating the land plane by movement of lift arms of a prime mover implement carrier.

16. The method as claimed in claim 15, further comprising:

manipulating a latching mechanism by operation of the reset bar, the latching mechanism being configured to extend the ripper teeth in the downwardly extended orientation wherein the ripper teeth are biased toward the extended orientation to be at least partially retractable upon rearward motion of the land plane or configured to secure the ripper teeth in the retracted orientation.

17. The method as claimed in claim 15, further comprising engaging and disengaging a latching mechanism while shifting the ripper teeth of the land plane between the extended orientation and the retracted orientation.

18. The method as claimed in claim 15, further comprising engaging and disengaging a cam rotatably coupled to a control arm with a cam arm while shifting the ripper teeth of the land plane between the extended orientation and the retracted orientation.

19. The method of claim 18, further comprising engaging and disengaging the cam with portions of a perimeter of a cam receiving cutout of the control arm.

20. The method as claimed in claim 15, further comprising biasing the ripper teeth toward the extended orientation to be at least partially retractable upon motion in a first direction of the land plane, the first direction being opposed to a second direction in which the ripper teeth engage and rip soil; and retracting the ripper partially against a biasing force by moving the land plane in the second direction.

\* \* \* \* \*